United States Patent

Petersen et al.

(10) Patent No.: US 7,710,920 B2
(45) Date of Patent: May 4, 2010

(54) COMMUNICATION NETWORK AND METHOD

(75) Inventors: Steen Petersen, Frederiksberg (DK); David J. Chater-Lea, Crowthorne (GB)

(73) Assignee: Motorola, Inc., Schaumburg, IL (US)

( * ) Notice: Subject to any disclaimer, the term of this patent is extended or adjusted under 35 U.S.C. 154(b) by 430 days.

(21) Appl. No.: 11/604,557

(22) Filed: Nov. 27, 2006

(65) Prior Publication Data

US 2007/0121564 A1    May 31, 2007

(51) Int. Cl.
H04L 12/56 (2006.01)
H04J 1/16 (2006.01)

(52) U.S. Cl. .................. 370/329; 370/389; 370/437

(58) Field of Classification Search ............ 370/401, 370/329, 389, 437
See application file for complete search history.

(56) References Cited

U.S. PATENT DOCUMENTS

| 5,878,347 | A * | 3/1999 | Joensuu et al. .............. 455/433 |
| 6,219,546 | B1 * | 4/2001 | Valentine et al. ............. 455/428 |
| 6,353,620 | B1 | 3/2002 | Sallberg et al. |
| 6,658,259 | B2 * | 12/2003 | McIntosh ..................... 455/462 |
| 6,961,575 | B2 * | 11/2005 | Stanforth ..................... 455/445 |
| 7,002,973 | B2 * | 2/2006 | MeLampy et al. .......... 370/401 |
| 7,072,961 | B1 * | 7/2006 | Maclean et al. ............. 709/224 |
| 2002/0187781 | A1 * | 12/2002 | Furlong ...................... 455/433 |
| 2006/0126536 | A1 * | 6/2006 | Patel et al. ................... 370/254 |

FOREIGN PATENT DOCUMENTS

WO    WO 2005107281 A2 *   11/2005

* cited by examiner

Primary Examiner—John Pezzlo

(57) ABSTRACT

A wireless, ad-hoc or private communications network comprising nodes, forming with other elements of the network a switching and management infrastructure (SwMI), and subscribers, wherein each of said nodes has a Visitor Location Register (VLR), and at least a part of said nodes are provided with Home Location Registers (HLRs) and at least a part of said nodes with said HLRs are provided with gateways, wherein in said network every node with an HLR is assigned to a node having a gateway and said SwMI directs calls to and from a subscriber of said network to an external network.

10 Claims, 1 Drawing Sheet

COMMUNICATION NETWORK AND METHOD

FIELD OF THE INVENTION

The invention relates to a communications network and a method of managing services to or from external networks and in particular, but not exclusively, in an ad-hoc or private communications networks based on a TETRA (TErrestrial Trunked RAdio) cellular communication system.

BACKGROUND OF THE INVENTION

In a cellular communication system (like for example the Global System for Mobile communication (GSM) and TETRA (TErrestrial Trunked RAdio)), a geographical region is divided into a number of cells each of which is served by a base station. One base station, also termed as Base Transceiver Station (BTS) with a switching infrastructure is referred as a node of the network. The switching infrastructure supporting BTS may be shared with other BTSs. The system infrastructure in a TETRA system is generally referred to as a switching and management infrastructure (SwMI), which substantially contains all of the communication elements apart from the MSs. This includes base transceiver stations (BTSs) connected to a conventional public-switched telephone network (PSTN) through base station controllers (BSCs) and mobile switching centres (MSCs). In geographical terms reference to a node is a reference to an area served by one BTS, and in network terms reference to a node is a reference to the infrastructure equipment required to support one or more BTSs. A remote unit referred also as subscriber or mobile station (MS) or communication unit is served via a radio communication link by the base station of the cell within which the remote unit is operating.

One of the basic advantages of the cellular communications systems is that subscriber may move from one geographical location to another one while receiving services from the network. To provide seamless service there are regions of overlapping coverage between base stations. As the subscriber moves from area served by a first base station towards area served by a second base station it enters the region of overlapping coverage. Within the region of overlapping coverage the subscriber changes the serving base station. This is known as cell reselection or handover.

The communication link from a BTS to a subscriber is generally referred to as a downlink communication channel. Conversely, the communication link from a subscriber to a BTS is generally referred to as an up-link communication channel.

To enable communication between two handsets operating in two different cells a fixed network interconnects the base stations. The fixed network is operable to route data between any two base stations and this way allows for communication between these two remote handsets. In addition, the fixed network may comprise gateway functions for interconnecting to external networks such as the Public Switched Telephone Network (PSTN). This allows subscribers to communicate with landline telephones and other communication terminals connected by a landline. Additionally the fixed network is adapted to perform functions required for managing a conventional cellular communication network including routing data, admission control, resource allocation, subscriber billing, mobile station authentication etc.

The TETRA communications system may be used as a public cellular communication system. However a principal application of TETRA communication systems is for use by organizations or groups such as emergency services. Special functions and services implemented in the TETRA system make this system especially suitable for services like police, emergency, fire rescue or others. One of such features provided by TETRA system, which is especially useful for the emergency services is controlling group calls as well as managing the membership of these groups. Other features and services provided by TETRA include, push-to-talk channel allocation, broadcast calls etc. In addition to trunked mode operation wherein remote units communicate via a base station, TETRA provides for the possibility of communication directly between remote units without participation of the infrastructure. This is known as Direct Mode Operation (DMO).

A deployable or ad-hoc network may be considered as one in which the topology of the network and number of nodes which together offer service to mobile users changes from time to time. The connections between these nodes also change in number and topography from time to time, either together with or independently of changes in the nodes. Nodes may be added or may be taken away. Some nodes may offer gateway services, and others may not be able to offer such services. The gateway services available at nodes may also change from time to time, such that at one time a node may be able to offer such services, but at another time, such services may not be available.

In such a deployable or ad-hoc mobile network, where users need to access services outside the network via gateways it can be difficult to determine which gateway should be accessed by a user, and which gateway should receive calls or other information from outside the network to deliver to the user. It can also be difficult to provide a fast set up of call services, especially group services in a truly ad hoc network. When calls are directed to users via gateways, it is expected that calls will be received at a gateway with a connection to the Home Location Register (HLR). This is because the HLR of the user will have information as to from which node the user is currently obtaining service. With an ad hoc network, the connection between any one gateway and the HLR of the user cannot be guaranteed. Calls originating from users may need to route to specific gateways. Identifying the specific gateway can be difficult in an ad hoc network. Gateways may not be available, or may not have external connections available, depending on the state of the network. If mobile users or their HLRs are fully distributed, it is not obvious whether either the node where the mobile user is connected has an available connection, or the node where the HLR is connected has a connection, which makes it difficult to determine how to route a call originated by the mobile user.

A need therefore exists for a method of controlling and identifying location information of subscribers in a communications network, and nodes where gateways are located particularly when the network is required to be operational irrespective of reconfiguration processes, wherein the above-mentioned disadvantages may be alleviated or overcome.

SUMMARY OF THE INVENTION

Accordingly, the Invention seeks to preferably mitigate, alleviate or eliminate one or more of the above mentioned disadvantages singly or in any combination.

According to a first aspect of the present invention there is provided a wireless, ad-hoc or private communications network including a plurality of nodes, forming with other elements of the network a switching and management infrastructure (SwMI), and a plurality of subscribers, wherein each of said nodes has a Visitor Location Register (VLR), and at least a part of said nodes are provided with Home Location Registers (HLRs) and at least a part of said nodes with said HLRs are provided with gateways said network being characterized in that every node with an HLR is assigned to a node having a gateway and said SwMI is adapted to direct all calls to and from a subscriber of said network to an external network via said assigned node with a gateway.

According to a second aspect of the present invention there is provided a method of managing services to or from external communications network in an ad-hoc or private communications network including a plurality of nodes, forming with other elements of the network a switching and management infrastructure (SwMI), and a plurality of subscribers, wherein each of said nodes has a Visitor Location Register (VLR), and at least a part of said nodes are provided with Home Location Registers (HLRs) and at least a part of said nodes with said HLRs are provided with gateways, said method being characterized in assigning every node with an HLR to a node having a gateway and said SwMI directs all calls to and from a subscriber of said network to an external network via said assigned node with a gateway.

The present invention beneficially allows for:
Transparent access to services outside a deployable or ad-hoc mobile network via gateways
Determination of appropriate gateways to carry calls between mobile users and fixed network gateways.
Determination of appropriate gateway for reception of calls or other information from outside the network to deliver to the user.

BRIEF DESCRIPTION OF THE DRAWINGS

The present invention will be understood and appreciated more fully from the following detailed description taken in conjunction with the drawings in which.

DESCRIPTION OF AN EMBODIMENT OF THE INVENTION

The term "Home Location Register" (HLR) herein below refers to a database containing configuration information and location information related to all subscribers home to a particular node or nodes. One HLR may cover more than one node.

The term "Visitor Location Register" (VLR) herein below refers to a database containing information on subscribers operating in a particular node and keeps pointers to respective HLRs (i.e. HLRs that are home for the subscribers listed in the VLR). Every node in the network has assigned a separate VLR.

The term "look-up table" herein below refers to a table which is copied into every node and is used to allocate the individual and group address space between nodes. This may operate as a set of individual entries for each individual user or group, for example arranged as a list, where each entry includes a reference to the node where the information relating to that individual or group is stored. It may simplify such a list by grouping identities together, for example by dividing the address space into blocks of numbers, then allocating each block to one of the nodes, i.e. identifies the correct HLR for each block of identities. As every node has the same look-up table, if a subscriber (or group member) registers at any node, that node can immediately know which node contains the HLR for that subscriber (or group).

The following description focuses on an embodiment of the invention applicable to a TETRA cellular communication system. However, it will be appreciated that the invention is not limited to this application but may be applied to many other communication systems (e.g. APCO Project 25 or GSM and other digital and analogue communication systems).

Figure 1:
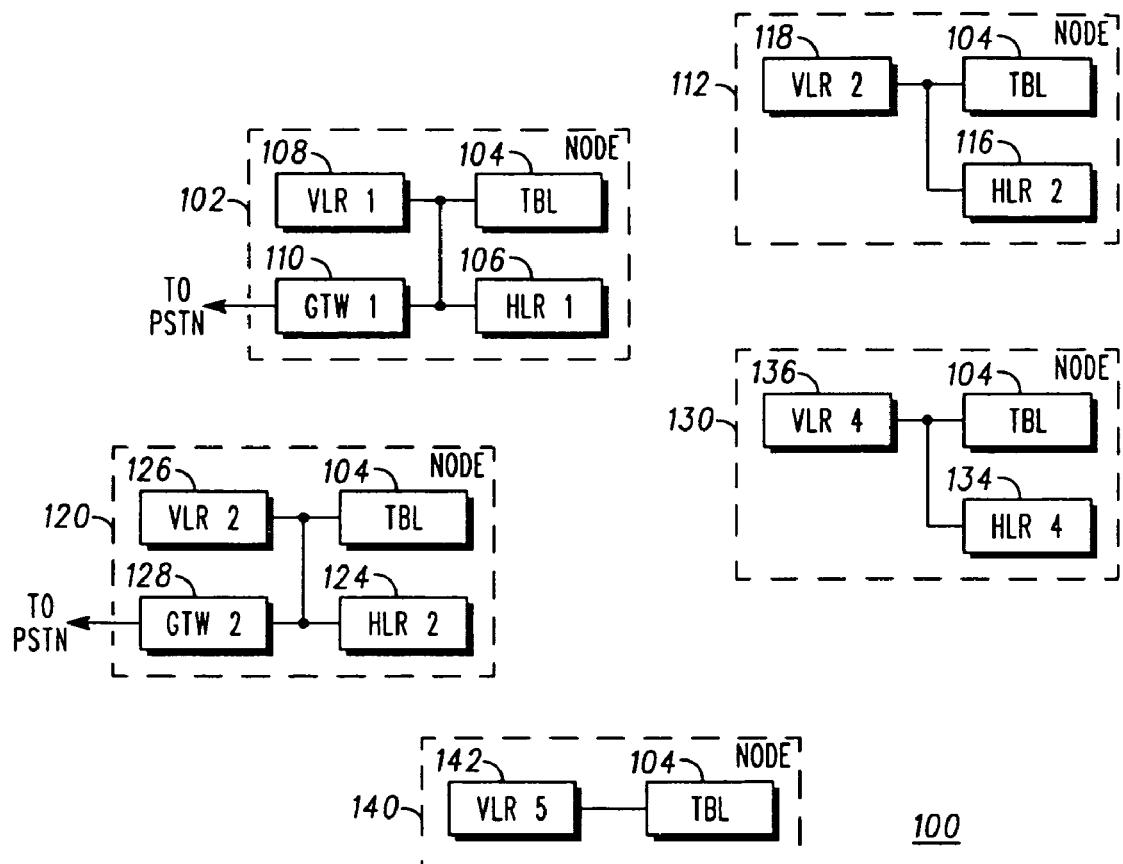
FIG. 1 is a diagram illustrating a communications network in accordance with one embodiment of the present invention.

With reference to FIG. 1 a wireless, ad-hoc or private communications network 100 (herein after referred to as network) in one embodiment of the present invention is shown. The network 100 comprises a plurality of nodes 102, 112, 120, 130, 140 forming with other elements of the network a switching and management infrastructure (SwMI). Each of said nodes 102, 112, 120, 130, 140 has a Visitor Location Register (VLR) 108, 118, 126, 136, 142 respectively. Each of the said nodes has a copy of a look-up table 104 which indicates the allocation of subscribers to HLRs. At least a part of said nodes, 102, 112, 120, 130, are provided with Home Location Registers (HLRs) 106, 116, 124, 134 and at least a part of said nodes with said HLRs are provided with gateways 110, 128. Every node with an HLR is assigned to a node having a gateway. In result of said assignment said SwMI directs all calls to and from a subscriber via said assigned gateway. If a first subscriber, which data is stored in a third HLR 116, requests a call to an external network the SwMI directs the call via said first gateway 110 as the third node 112 is assigned to the first node 102.

According to one embodiment of the invention, the allocation of identities to nodes is made such that individuals are allocated only to HLRs 106, 124 in nodes 102, 120 where gateways 110, 128 are located. In one embodiment the external network(s) to which the network 100 is connected is provided with the look up table 104 or a subset of the data from the look-up table 104 to identify the node where data appertaining to a specific subscriber is contained in the HLR. If a call is to be placed to a user from the external network, the external network will then have the information needed to send the call to the first gateway 110 or the second gateway 128 located at the first and second nodes 102 or 120 respectively, where the HLR containing the subscriber's information is located. The network 100 can then route the call to the subscriber, as the HLR contains information indicating at which node the subscriber is currently located.

According to a further embodiment of the invention, nodes can be identified where gateways are present, but not connected to an external network. In this case, subscribers are not allocated to HLRs at these nodes, but only to HLRs at nodes where gateways have connections to the external network.

According to another embodiment of the invention, subscribers' data may be contained in HLRs 106, 116, 124, 134 located at any of the nodes irrespective of whether the node possesses a gateway. Each of the HLRs 106, 116, 124, 134 contains a reference to a node 102, 120 where a gateway 110, 128 is located. If the gateway is collocated with the HLR, as in the case of first HLR 106 and said first gateway 110, the reference in the HLR would often be to the gateway located at the same node, for example said first HLR 106 would have a reference to said first gateway 110, however this does not need to be the case.

The gateways also contain references to the HLRs that are associated by the previous reference to these gateways. As it is explained above, if HLR 106 has a reference not to gateway 110, but to gateway 128 (e.g. in situation when the gateway 110 is not connected to the external network or is not operable) the previous reference of HLR 116 is, originally pointing to gateway 110 is redirected to point to gateway 128.

The external network is provided with information that indicates the appropriate gateway for each subscriber or group. In this way, if a call is made from the external network to a subscriber or group, the external network identifies the correct gateway 110 or 128 to which to route the call; and once the call is received by the gateway, it searches each of its referenced HLRs to find the actual HLR containing the individual subscriber or group's data, and so is able to recover location information to route the call. The routing of the call inside the network may be made either by the gateway directly upon receiving routing information from the HLR, or by forwarding the call to the node where the subscriber or group's HLR is located, and this node in turn forwards the call to the subscriber or to said group.

It can be seen that this embodiment also allows for the case where not all gateways have a connection to the external network. The HLRs only contain references to the gateways that have connections to the external network, and those gateways have the corresponding references to all HLRs.

It can also be seen that the references between HLRs and gateways may be unique, in that one HLR only refers to one gateway, and only gateway refers to any one HLR. However in another embodiment the references are not unique, and provided that each gateway 110, 128 is located at a node where a copy of the look-up table 104 is located, calls from the external network may be routed to the subscriber or group as the correct HLR for a subscriber or group can readily be identified.

In one embodiment of this invention, the configuration of table 104 may be made by manual methods, or by configuration from an application.

In another embodiment of this invention assigning a node to a node having a gateway is controlled by an external network. In this embodiment the configuration of table 104 is made by the external network, which may determine which are the most appropriate gateways to which to route calls destined for subscribers or groups of the ad hoc network 100.

In another embodiment of the invention, said nodes 102, 112, 120, 130, 140 are adapted to search for a node having a gateway. The purpose of this search is to assign HLRs to said first 102 and second 120 nodes having the first and second gateway 110, 120 respectively. Once a node with a gateway has been discovered by the search process, the HLR can record a reference to this node with a gateway, and can provide the gateway with the corresponding reference to the HLR. So by way of example, the third node 112 may conduct a search and identify the first node 102 as having an appropriate first gateway 110, and may store a reference to the first node 102, and may provide the first gateway 110 with a reference to itself (that is the third HLR 116).

The search process may include well known techniques to provide reference to gateways with desirable characteristics, such as lowest number of connecting links between a node and an identified gateway, lowest cost routes between a node and an identified gateway, gateways with certain bandwidth or service capabilities, gateways with certain characteristics of connection to external networks, such as services, cost of connection and other such parameters, or any combination thereof.

The search may identify gateways with no external network connections and may reject these in favour of gateways 110, 128 with external connections.

The search may result in unique relationships between nodes containing HLRs and node containing gateways, or may result in multiple relationships.

The search may be initiated by manual action, or by some other event, such as the changing of a gateway's status of connection to an external network, which may include change of service characteristics. A search resulting from such a change in characteristics can minimize the effect of inoperability an existing gateway. This search may be carried out by every node in the network having an HLR, or by only those with references to the gateway whose characteristics have changed. The search can be carried out by a searching algorithm implemented in software operating on said nodes 102, 112, 120, 130, 140.

As a result of a search, or of manually initiated update to the network, the subscriber's information contained in one HLR may be moved to another HLR. For example, if the first gateway 110 located at the first node 102 is disconnected from the external network or removed, the subscriber's information contained in the first HLR 106 may be transferred to the second HLR 124 which is located at the second node 120 which still has a connected second gateway 128. The look-up table 104 describing allocation of subscribers to HLRs will also be updated. Alternatively, the HLR data may remain in the HLR at the same node, but references are updated, so that for example the first HLR 106 may now refer to the second node 120 with the second gateway 128 in case of disconnection or removal of the first gateway 110 located at the first node 102.

A complete node may be disconnected from the network 100. The individual subscriber's and group's data in the HLR associated with this node may be moved to another HLR according to GB patent application No. 0409473.6. For example, if the first node 102 is removed from the network 100, the subscribers' data contained in the first HLR 106 located at the first node 102 may be moved to the second HLR 124 located at the second node 120 which contains the second gateway 128. To have the network 100 fully operational all VLRs 108, 118, 126, 136, 142 in the network 100 are updated with the new location of data previously stored in the first HLR 106. Otherwise they would point to HLR that does not exist.

Similarly the reconfiguration of the network 100 and transferring of the first HLR 106 to the second node 120 modifies structure of a look-up table 104 of the network 100. Look-up table 104 in the nodes of the network 100 is then updated with information where the records from the first HLR 106 are transferred to.

Alternatively, subscribers' data may be located to another HLR, for example the third HLR 116 at the third node 112 where no gateway is located, and the third HLR 116 can be given reference to the second gateway 128 located at the second node 120 to enable access to and from those subscribers from the external network via the second gateway 128.

In one embodiment the configuration of subscribers in the HLRs 106, 116, 124, 134 or the assignment of the subscribers in these HLRs 106, 116, 124, 134 is provided by the nodes 102, 112, 120, 130 to the external network, so that the external network always provides calls to the mobile network through a gateway with an association to the HLR where the subscriber record is held.

Where an individual subscriber or a group requires no services that make use of a gateway, the subscriber's HLR entry may be made at any appropriate node in the network. Typically, this may be at a node close to the normal location of the individual subscriber or a group.

Figure 2:
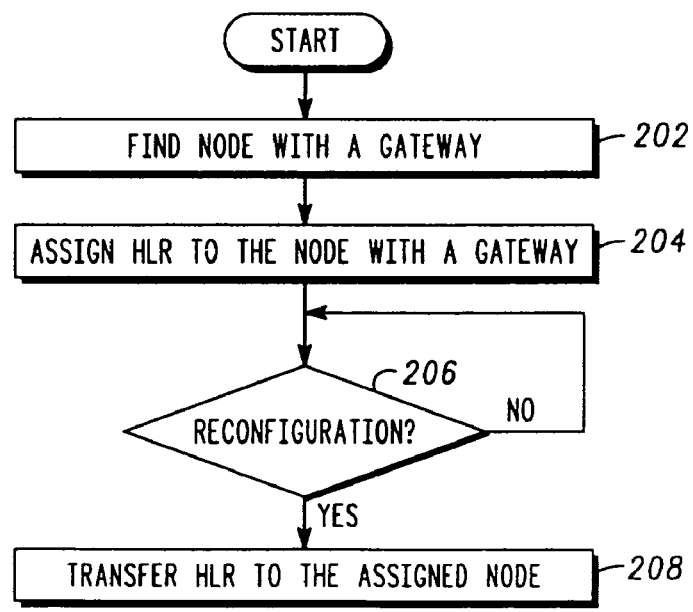
FIG. 2 is a flow chart illustrating a method of managing services to or from external communications networks in an ad-hoc or private communications network in accordance with one embodiment of the present invention.

Referring to FIG. 2 a method of managing services to or from external communications networks in an ad-hoc or private communications network 100 is shown. Each node 102, 112, 120, 130 in the network 100 that have a HLR carries out a search 202 for a node that has a gateway 110, 128. When the node 102, 120 with a gateway 110, 128 is found HLR from the node that carried out the search is assigned 204 to the node having the gateway. If more then one node with a gateway is found the nodes select gateways with desirable characteristics, such as lowest number of connecting links between a node and an identified gateway, lowest cost routes between a node and an identified gateway, gateways with certain bandwidth or service capabilities, gateways with certain characteristics of connection to external networks, such as services, cost of connection and other such parameters, or any combination thereof.

In one embodiment if a third node 112 without a gateway is assigned to a first node 102 having a gateway and said first node is to be reconfigured 206 then the HLRs assigned 204 to the first node are transferred 208 to another node with the gateway. In one embodiment records of said HLR transferred to the first node 102 are merged with records of the first HLR 106. In another embodiment said records of said HLR transferred to the first node 102 are assigned to said first node 102 as a separate HLR in addition to the first HLR 106 that was assigned to said first node 102 before said transfer. This solution is especially beneficial (as allows for easy transfer back) when said node is temporarily disconnected from the network 100.

Alternatively instead of transferring HLRs references in respective HLRs are updated to point to a node with a gateway.

The invention claimed is:

1. A wireless, ad-hoc or private communications network comprising a plurality of nodes, forming with other elements of the network a switching and management infrastructure (SwMI), and a plurality of subscribers, wherein each of said nodes has a Visitor Location Register (VLR), and at least a part of said nodes are provided with Home Location Registers (HLRs) and at least a part of said nodes with said HLRs are provided with gateways said network being characterized in that every node with an HLR and without a gateway is assigned to a node having a gateway and said SwMI is adapted to direct all calls to and from a subscriber of said network to an external network via said assigned node with a gateway.

2. The network according to claim 1 wherein said nodes without a gateway are adapted to carry out said assignment to said node having a gateway if said assignment is a) predefined, b) controlled by an external network, c) or carried out as a result of a search for a node having a gateway.

3. The network according to claim 2 wherein a first node having a first gateway is adapted to transfer data from a first HLR belonging to said first node to said second node having a second gateway a) if the first gateway is not available or b) if characteristics of the first gateway are changed.

4. The network according to claim 2 wherein a first node having a first gateway is adapted to create reference from a first HLR belonging to said first node to said second node having a second gateway a) if the first gateway is not available or b) if characteristics of the first gateway is changed.

5. The network according to claim 4 wherein said one or more of said HLRs is adapted to store a reference to one or more gateways.

6. The network according to claim 5 wherein each of said nodes or the VLRs within said nodes has a look-up table, which is adapted to identify a correct HLR for every subscriber operating in the network and said nodes are adapted to update said look-up tables with the changes in the HLRs.

7. The network according to claim 6 wherein said nodes are adapted to provide location information from said HLRs to the external network.

8. A method of managing services to or from external communications networks in an ad-hoc or private communications network comprising a plurality of nodes, forming with other elements of the network a switching and management infrastructure (SwMI), and a plurality of subscribers, wherein each of said nodes has a Visitor Location Register (VLR), and at least a part of said nodes are provided with Home Location Registers (HLRs) and at least a part of said nodes with said HLRs are provided with gateways, said method being characterized in assigning every node with an HLR and without a gateway to a node having a gateway and said SwMI directs all calls to and from a subscriber of said network to an external network via said assigned node with a gateway.

9. The method according to claim 8 wherein said nodes without a gateway are adapted to carry out said assignment to said node having a gateway if step of carrying out said assignment is a) predefined, b) controlled by an external network, or c) carried out as a result of a search for a node having a gateway.

10. The method according to claim 9 wherein a first node having a first gateway transfers data from a first HLR belonging to said first node to said second node having a second gateway if the first gateway is not available or if characteristics of the first gateway is changed.

* * * * *

UNITED STATES PATENT AND TRADEMARK OFFICE
CERTIFICATE OF CORRECTION

| | | |
|---|---|---|
| PATENT NO. | : 7,710,920 B2 | Page 1 of 1 |
| APPLICATION NO. | : 11/604557 | |
| DATED | : May 4, 2010 | |
| INVENTOR(S) | : Petersen et al. | |

It is certified that error appears in the above-identified patent and that said Letters Patent is hereby corrected as shown below:

ON THE FACE PAGE

1. On the Face Page, in Column 1, below field "(65)", insert field -- (30) Foreign Application Priority Data May 26, 2004 (UK)....0411699.2 & May 20, 2005 (WO)....PCT/US05/17864 --.

Signed and Sealed this
Eighth Day of November, 2011

David J. Kappos
*Director of the United States Patent and Trademark Office*